(12) United States Patent
Braune et al.

(10) Patent No.: US 7,505,620 B2
(45) Date of Patent: Mar. 17, 2009

(54) METHOD FOR THE MONITORING OF A MONITORED ZONE

(75) Inventors: Ingolf Braune, Gundelfingen (DE); Jörg Grabinger, Emmendingen (DE)

(73) Assignee: Sick AG, Waldkirch (DE)

( * ) Notice: Subject to any disclaimer, the term of this patent is extended or adjusted under 35 U.S.C. 154(b) by 570 days.

(21) Appl. No.: 11/103,880

(22) Filed: Apr. 12, 2005

(65) Prior Publication Data

US 2005/0232465 A1 Oct. 20, 2005

(30) Foreign Application Priority Data

Apr. 14, 2004 (DE) .................... 10 2004 018 016

(51) Int. Cl.
*G06K 9/00* (2006.01)
(52) U.S. Cl. .................... 382/152; 348/143; 345/632
(58) Field of Classification Search ............... 382/100, 382/103, 106, 107, 141, 149, 152, 153, 154, 382/181, 190, 195; 348/154, 155, 143; 345/619, 345/629, 632, 633
See application file for complete search history.

(56) References Cited

U.S. PATENT DOCUMENTS

| | | | | |
|---|---|---|---|---|
| 5,128,753 A * | 7/1992 | Lemelson | .................... | 382/141 |
| 5,144,661 A * | 9/1992 | Shamosh et al. | ............ | 348/143 |
| 5,323,470 A * | 6/1994 | Kara et al. | .................... | 382/103 |
| 6,289,371 B1 * | 9/2001 | Kumpf et al. | ............... | 709/203 |
| 6,297,844 B1 * | 10/2001 | Schatz et al. | .................. | 348/43 |
| 6,469,734 B1 * | 10/2002 | Nichani et al. | .............. | 348/152 |
| 6,737,970 B2 * | 5/2004 | Wuestefeld et al. | ......... | 340/552 |
| 6,829,371 B1 * | 12/2004 | Nichani et al. | .............. | 382/103 |
| 7,065,241 B2 * | 6/2006 | Lehner et al. | ............... | 382/152 |
| 7,110,569 B2 * | 9/2006 | Brodsky et al. | ............. | 382/103 |
| 2004/0125206 A1 * | 7/2004 | Lohmann | .................... | 348/155 |
| 2005/0088520 A1 * | 4/2005 | Wiesinger et al. | ........... | 348/143 |

FOREIGN PATENT DOCUMENTS

| | | |
|---|---|---|
| DE | 196 03 766 A1 | 8/1997 |
| DE | 197 09 799 A1 | 9/1998 |

(Continued)

*Primary Examiner*—Anand Bhatnagar
(74) *Attorney, Agent, or Firm*—Harness, Dickey & Pierce, P.L.C.

(57) ABSTRACT

In a method for the monitoring of a monitored zone next to and/or in an apparatus having at least one driven movable part, video images are used which were detected in time sequence by at least two video cameras whose fields of view overlap at least partly in an overlap region in the monitored zone. On the basis of the first video images detected by a first one of the video cameras, a first recognition and/or tracking of virtual objects is carried out and, on the basis of the second video images detected by a second one of the video cameras, a second recognition and/or tracking of virtual objects is carried out, the virtual objects corresponding to real objects at least in the overlap region. For the classification and/or determination of the position and/or the movement of at least one real object in the overlap region, virtual objects corresponding to the real object from the first and second virtual object recognition and/or tracking processes are determined and data determined in each case for both virtual objects on their virtual object recognition and/or tracking are evaluated. At least one monitoring signal is formed in dependence on the evaluation.

24 Claims, 2 Drawing Sheets

FOREIGN PATENT DOCUMENTS

| | | |
|---|---|---|
| DE | 198 09 210 A1 | 9/1999 |
| DE | 100 26 711 A1 | 6/2001 |
| DE | 100 00 287 A1 | 7/2001 |
| DE | 100 02 085 A1 | 8/2001 |
| DE | 100 33 608 A1 | 2/2002 |
| DE | 100 49 366 A1 | 4/2002 |
| DE | 101 43 504 A1 | 3/2003 |
| EP | 1 061 487 A1 | 12/2000 |

* cited by examiner

METHOD FOR THE MONITORING OF A MONITORED ZONE

CROSS-REFERENCE TO RELATED APPLICATIONS

This application claims the benefit of German Application No. 10 2004 018 016.4, filed Apr. 14, 2004. The disclosure of the above application is incorporated herein by reference.

FIELD OF THE INVENTION

The present invention relates to a method for the monitoring of a monitored zone, in particular of a monitored zone next to and/or in an apparatus having at least one driven movable part.

BACKGROUND OF THE INVENTION

Methods of monitoring a monitored zone are generally known and can be used to monitor zones close to and/or in apparatuses having at least one movable part, for example machines, which could injure the operator under unfavorable circumstances. Examples for such machines are stamping and bending machines, in which a bending stamp presses metal sheet against a bending tool and deforms it, shears, punching presses or robots.

To be able to achieve a productivity which is as high as possible by low standstill times or downtimes of such a machine, it is desirable in a method of the aforesaid type that a danger for the operator can be recognized as unequivocally as possible and can be distinguished from other processes or movements of other real objects in the region of the machine so that the machine only needs to be stopped in the event of an actual danger where possible.

Such a method should be able to be carried out in real time so that the normal working speed on such a machine is not impaired.

SUMMARY OF THE INVENTION

It is therefore the underlying object of the present invention to provide a method for the monitoring of a monitored zone next to and/or in an apparatus having at least one driven movable part which permits a good recognition of a danger to the operator by the apparatus and which can simultaneously be carried out fast.

The object is satisfied by a method having the features of claim 1.

In the method in accordance with the invention for the monitoring of a monitored zone next to and/or in an apparatus having at least one driven movable part, video images are used which were detected in time sequence by at least two video cameras whose fields of view overlap at least partly in an overlap region in the monitored zone. On the basis of the first video images detected by a first one of the video cameras, a first recognition and/or tracking of virtual objects is carried out and, on the basis of the second video images detected by a second one of the video cameras, a second recognition and/or tracking of virtual objects is carried out, the virtual objects corresponding to real objects at least in the overlap region. For the classification and/or determination of the position and/or the movement of at least one real object in the overlap region, virtual objects corresponding to the real object from the first and second virtual object recognition and/or tracking processes are determined and data determined in each case for both virtual objects on their virtual object recognition and/or tracking are evaluated. At least one monitoring signal is formed in dependence on the evaluation.

In the method in accordance with the invention, video images are used which were detected by at least two video cameras. The video images can generally be infrared video images, monochrome video images or also color video images for whose detection the video cameras must then be made suitable.

The fields of view of the video cameras overlap in an overlap region which lies at least partly in the monitored zone, but does not have to completely include it. The video cameras are preferably mounted so that as few hidden regions as possible result in the monitored zone.

To be able to link the information in the video images of the two video cameras to one another, their relative positions and alignments to one another and their imaging properties are preferably known explicitly or—by suitable calibration methods—at least implicitly.

The video images are detected in a time sequence and particularly preferably synchronously so that the information of the two video cameras gained from the video images can be simply linked to one another video image by video image. In this manner, at least one first sequence of video images detected with a first one of the two video cameras and a second sequence of video images detected with the second video camera are created.

In accordance with the invention, a virtual object recognition and/or tracking is carried out for each of the video image sequences in which virtual objects corresponding to real objects in the video images are recognized and or tracked. Within the framework of the invention, a real object is not only understood as a body spatially separated from other bodies, but, for example, also as a part of an assembled or multi-element apparatus which can be differentiated, for example a segment of a robot arm.

Within the framework of the invention, for reasons of simplicity, a real object will also be understood to be a living being, in particular a person, or a part thereof. Generally, known methods for the recognition and/or tracking of virtual objects in two-dimensional video images, which can preferably be carried out independently of one another, can be used for this virtual object recognition and/or tracking. To facilitate virtual object tracking, for example with partly hidden virtual objects, a coupling of the methods is, however, not precluded. The virtual objects can in particular be given by features or feature combinations in the video images which define the real object in the video image with respect to its surroundings.

Virtual objects are associated with real objects visible in both video images in both virtual object recognition and/or tracking methods and data can be known for these from their respective virtual object recognition and/or tracking with respect to a classification and/or position and/or movement, i.e. in particular a movement direction and/or movement speed.

The virtual object recognition and/or tracking methods can in particular be carried out in cycles in which respective current video images of the respective video image sequence are processed.

Data on properties of the real object, in particular a type, i.e. a classification, and/or its position and/or its movement, in particular its movement direction and/or movement speed, can be determined on the basis of the data on the two virtual objects corresponding to the same real object.

The data with respect to the position and/or to the movement can preferably include corresponding coordinates in three-dimensional space on the basis of the different perspectives of the video cameras and can thus provide more and/or more precise information than a virtual object recognition and/or tracking on the basis of only one sequence of video images.

A monitoring signal can then be formed in dependence on the data evaluated in this manner, said monitoring signal being able to be supplied, for example, to corresponding warning devices or to a control of the apparatus with the driven, movable part. The monitoring signal does not need to be formed in every cycle, but, for example, only when a pre-determined criterion e.g. for a danger has been satisfied. This monitoring signal in particular only needs to indicate that a danger is present at all. However, preferably, additional data are also output with respect to the position and/or movement of an endangered or dangerous real object of or a corresponding virtual object.

This procedure permits a higher working speed than a method in which three-dimensional stereo images are first formed from video images of at least two video cameras on the basis of which an individual virtual object recognition and/or tracking can then be carried out. This is due to the fact, among others, that—on a fusion of the video images of two video cameras to form three-dimensional stereo images—the video images continually have to be aligned to one another, at least on the scale of some pixels, which requires considerable computing effort and/or time effort.

By the use of at least two different perspectives of the overlap region, a good recognition of virtual objects is moreover also facilitated which would, for example, be difficult to identify in only one video image due to an unfavorable perspective.

Further developments and preferred embodiments of the invention are described in the claims, in the description and in the drawings.

Virtual objects in the video images can generally be recognized with reference to any desired suitable features. Since persons are frequently located in the area of machines and their contours change on a movement, it is preferred for the definition of virtual objects in the video images for connected areas to be determined which correspond to surface areas on a real object corresponding to a virtual object which have similar surface properties in accordance with at least one pre-determined criterion. A repeat recognition of such virtual objects can then also take place on the basis of these surface properties so that the contour only has to play a subordinate role.

It is particularly preferred for the definition of the virtual objects in the video images for connected areas to be determined which have similar gray values and/or colors and/or textures in accordance with at least one pre-determined criterion. Generally, known similarity criteria can be used as the criterion, for example, when colors are used, criteria with respect to the color difference in the color model.

To facilitate the association of virtual objects of the two virtual object recognition processes and/or tracking processes to the same real object, and thus also to one another, it is preferred for at least one virtual object class to be assigned to the virtual objects. For this purpose, respective virtual object classes for virtual objects can be pre-determined in the process which correspond to real objects of a type suitable for the purpose of the process. For example, virtual object classes can be provided for persons, workpieces or also for machine parts. For example, two virtual objects of the same virtual object class which occur in video images of both the first video camera and the second camera in corresponding spatial regions can simply be recognized as corresponding to the same real object which then has the type corresponding to the respective virtual object class.

The assignment of a virtual object class can, for example, take place in dependence on gray values and/or colors and/or textures and/or contours of a virtual object. However, gray values or colors, for example, can change in dependence on lighting conditions or also on contamination, for example. It is therefore preferred for features pre-determined on virtual objects to be recognized and for at least one virtual object class to be associated with the virtual objects in dependence on the recognized, pre-determined features. These features can in particular be cooperative targets. Furthermore, pre-determined markings, for example surface sections having a pre-determined pattern, can be used to mark specific real objects and to permit a classification. The markings are therefore to be understood as a feature by means of which an ordering into virtual object classes can take place.

It is sufficient for the purposes of the monitoring in some cases only to detect moving real objects, since static real objects, in particular walls, fixedly mounted supports or similar devices, frequently do not represent any danger potential. It is therefore preferred for only moving virtual objects to be recognized and/or tracked in the virtual object recognition. The processing of the video images can be accelerated a lot by this.

It is particularly preferred for the recognition of moving virtual objects for a background which does not move and/or change over the course of time to be eliminated from the used video images for the determination of at least one moving virtual object. For this purpose, a video image of the background without moving virtual objects can in particular be detected.

For the virtual object recognition and/or tracking, a differential image can then be formed between a currently detected video image and the background image which is detected by the corresponding video camera and which is then further processed for the virtual object recognition and/or tracking. A better recognition and/or tracking of virtual objects can also result, in addition to a considerably increased working speed of the method, by the reduction of the number of features in the video images resulting from this procedure.

To accelerate the processing of the video images, it is preferred for the temporal and/or spatial resolution of the video images to be reduced at least for a preliminary evaluation of the video images of at least one video camera. After a determination of areas of interest for the further evaluation, these are preferably further processed with a higher resolution. The resolution can, for example, be reduced in a temporal respect by using only images which do not directly succeed one another, for example only every second image. Corresponding filters can be used for the spatial reduction of the resolution. For example, pre-determined pixel lines or pixel columns or pixels arranged in the manner of a chess board can remain out of consideration in the preliminarily processing.

The common processing of the data with respect to virtual objects which correspond to the same real object can take place in different manners. It is preferred in an embodiment of the method in accordance with the invention for a fusion object to be associated with virtual objects of the first and second virtual object recognition and/or tracking corresponding to the same real object, with the position and/or movement and/or properties of said fusion object being determined in dependence on data with respect to the positions and/or movements and/or properties of the virtual objects corresponding to the real object. The movement of the fusion object can in particular be given by a movement direction and a movement speed; however, one of these data is sufficient.

It is particularly preferred for a spatial extent also to be associated with the fusion object as a property. It can result from the extents of the virtual objects corresponding to the real object or to the fusion object and/or from their relative positions to one another. It is in particular possible to use the virtual object classes of the virtual objects used for the definition of the spatial extent. For this purpose, in dependence on the virtual object classes of the virtual objects corresponding to a real object, a corresponding reference body, optionally a reference body to be scaled, can be associated with the corresponding fusion object. For example, a recognized lower arm of an operator could be represented by a cylinder whose dimensions are estimated from the relative arrangements of the video cameras to one another and to the arm and to the surfaces and positions of the corresponding virtual objects detected in the video images in connection with the imaging properties. Such a fusion object can thus generally represent a three-dimensional body, in particular a multi-element body, which has a pre-determined shape and size and position and/or speed and/or movement direction. The use of such fusion objects permits a model-like representation of the positions and movements of real objects or parts therefore in space and thus in particular facilitates the recognition of danger situations for operators of the apparatus.

It is then particularly preferred, after formation of a fusion object in a cycle, for its data with respect to its position and/or movement and/or properties to be up-dated in dependence on the data of the virtual objects corresponding to the real object with respect to their positions and/or movements and/or properties in at least one following cycle. This procedure permits one track of the fusion object or a plurality of tracks of the individual virtual objects of the fusion object to be tracked over time.

If fusion objects were recognized or formed in a cycle, it is preferred if, in the virtual object tracking of a virtual object associated with a fusion object, said virtual object is not recognized in a current video image, for only the data of another virtual object associated with the fusion object with respect to its position and/or movement and/or properties to be used for the determination of data with respect to the position and/or movement and/or properties of the fusion object. On a temporary, complete hiding of a virtual object in one of the video images, a monitoring can thus nevertheless still take place on the basis of the other video image.

The case can frequently occur that, on a virtual object tracking and/or on a formation of fusion objects for different parts of a real object or of a person, virtual objects or fusion objects are each determined separately whose possible positions to one another can be restricted, for example, by a coupling of the corresponding parts of the real object. It is therefore preferred for one virtual object grouping or one fusion object grouping to be formed from at least two virtual objects or fusion objects whose movement is coupled.

The association of virtual objects or of fusion objects with a virtual object grouping or fusion object grouping, and thus the formation of the grouping from the corresponding virtual objects or fusion objects, can take place on the basis of different criteria. For example, it can thus be determined with reference to movement procedures of the virtual objects or fusion objects detected in the video images whether a coupling between them is present.

It is furthermore possible in the check whether two virtual objects or fusion objects should be combined to one virtual object grouping or fusion object grouping to use their relative positions to one another and the classes of the virtual objects or the virtual objects underlying the fusion objects or even classes of the fusion objects themselves.

It is furthermore preferred to recognize virtual objects and/or fusion objects for the formation of a virtual object grouping or a fusion object grouping in dependence on whether pre-determined features on these were recognized and on whether they satisfy a pre-determined criterion with respect to their relative positions to one another. These features can in particular be pre-determined cooperative targets. Furthermore, corresponding pre-determined marking regions applied to the surface of the real objects can be used such as have already been mentioned.

To permit a simple interpretation of the situation in the monitored zone, it is preferred for a fusion object class or a class for virtual object groupings or fusion object groupings to be associated with at least one fusion object and/or with a virtual object grouping or a fusion object grouping. The fusion object classes or the classes for virtual object groupings or fusion object groupings, like the virtual object classes for the virtual objects of the two-dimensional image processing or virtual object tracking, can serve to correspondingly order fusion objects or virtual object groupings or fusion object groupings which correspond to real objects or parts of real objects of a pre-determined type and so to facilitate the monitoring of the monitored zone.

The association of classes can take place in dependence on at least one association criterion.

In an embodiment of the method in accordance with the invention, it is preferred for pre-determined features on virtual objects to be recognized and for at least one fusion object class or a class for virtual object groupings or fusion object groupings to be associated with the fusion objects and/or virtual object groupings or fusion object groupings in dependence on the recognized, pre-determined features on the virtual objects associated with fusion objects or virtual object groupings or fusion object groupings. Cooperative targets can in particular be used as pre-determined features. Furthermore, corresponding marking areas can be applied to different parts of a real object which correspond to a virtual object grouping or fusion object grouping. For example, corresponding emblems having an easily recognizable characteristic marking can be applied to work gloves and to the sleeves of work clothing for an operator. The fusion objects corresponding to the sleeve and the glove could then simply be associated with the corresponding fusion object grouping using the emblems located on them.

A further variant for the classification of fusion objects or functional object groupings consists of a class being learned. It is preferred for this purpose for a check to be made on the basis of the video images whether a person or a real object contacts a pre-determined stationary, cooperative target for a pre-determined minimum period and for the corresponding features to be used in this case for the definition of a class for a permitted fusion object to be protected or for a permitted fusion object grouping to be protected. The cooperative target can in particular be given by at least one pre-determined feature in the video image.

It is furthermore preferred for the association of classes to virtual objects, fusion objects or groupings for a class for virtual objects or fusion objects or virtual object groupings or fusion object groupings to be associated with a virtual object and/or a fusion object and/or a virtual object grouping and/or a fusion object grouping in dependence on whether at least one section of the virtual object or of the fusion object or of the virtual object grouping or fusion object grouping is moved into a pre-determined section of the monitored zone, in particular of the overlap region. The fact is utilized in this process that workpieces to be machined in the region of machines can frequently enter into the monitored zone or the overlap region from a clearly defined spatial zone and that the real objects entering into the spatial zone can only be workpieces.

It is furthermore preferred for a shape of the virtual object or of a fusion object or of a virtual object grouping or fusion object grouping to be used for the classification. Such a classification can in particular prove to be simple and reliable when real objects of a pre-determined fixed form, which uniquely characterizes the real objects for the purposes of the monitoring, occur in the monitored zone. A classification in dependence on the shape in particular appears especially advantageous with a workpiece to be machined.

Combinations of the previously listed criteria as well as further criteria can also be used for the classification.

It is in particular preferred for the purposes of the monitoring of a zone in front of a machine for at least one class to be used for fusion objects and/or fusion object groupings for fusion objects or fusion object groupings critical to safety and for at least one class to be used for fusion objects and/or fusion object groupings for neutral fusion objects or fusion object groupings. Fusion objects or fusion object groupings critical to safety can in particular be present if these correspond to living beings, in particular people, or to particularly valuable real objects or devices which may in no way be damaged. Neutral fusion objects or fusion object groupings can in particular correspond to real objects which can be guided, for example for machining, into the zone of the apparatus having the moving part, in particular of a machine, without danger and can, optionally, be machined there. It is possible by this classification to first determine whether a given fusion object or a given fusion object grouping is to be classed as critical to safety or as neutral and to determine in dependence on this classification whether a danger is present or not.

It is preferred for the recognition of dangers for a protected zone to be assigned to at least one moving fusion object and/or to one moving fusion object grouping and for a check to be made whether another fusion object and/or another fusion object grouping is entering into the protected zone. In this case, a corresponding monitoring signal can be formed and/or output. The protected zone can in particular be moved along with the fusion object and/or the fusion object grouping. One thus moves away from the otherwise usual concept of a stationary protected zone close to an apparatus with a driven movable part, in particular a production machine. A differentiated analysis of the scene in front of the apparatus is rather made possible, in particular on the use of classes for fusion objects and/or fusion object groupings critical to safety and neutral fusion objects and/or fusion object groupings, such that a danger is, for example, not recognized when only a workpiece is brought into the overlap region and into close proximity to the movable part of the apparatus or machine in order to be machined there. A corresponding monitored signal rather only needs to be triggered, for example, when a body part of a machining person is moved into the area of the apparatus or of the driven moving part of the same.

To be able to fix the size and shape of the protected zone, it is particularly preferred for a class to be assigned to at least one fusion object and/or to one fusion object grouping and for a protected zone to be assigned to the fusion object or the fusion object grouping at least in dependence on the assigned class. The assignment of the protected zone can take place in dependence on the class, but also in dependence on further parameters. The protected zone for a fusion object or a fusion object grouping can in particular be directed in its shape to the shape of the corresponding fusion object or of the corresponding fusion object grouping.

It is furthermore preferred for a protected zone to be assigned to a fusion object and/or to a fusion object grouping at least in dependence on its position and/or movement, in particular on its movement direction and/or movement speed. The size of the protected zone for a hand of an operator or for a corresponding fusion object can, for example, be selected to be larger when the hand moves in the direction toward the apparatus and is simultaneously very close to the apparatus than on a movement in the reverse direction or at a larger distance from the apparatus. It can, for example be determined whether a fusion object is very close to the apparatus in that it could move into the area of the apparatus and in particular into the movement track of the driven moving part of the apparatus at a maximum assumed movement speed within a pre-determined time interval which can, for example, correspond to the time in which the movement of the moving part of the apparatus can be interrupted.

It is moreover preferred for the extent of the protected zone of a fusion object and/or of a fusion object grouping to be determined in dependence on at least one property of at least one other fusion object and/or of one other fusion object grouping.

Combinations of the aforesaid criteria are preferably used to fix the shape and/or size of the protected zone.

If protected zones have been fixed for fusion objects and/or for fusion object groupings, it is preferred for a movement of at least one fusion object and/or of fusion object grouping to be predicted at at least one future point in time, for a check to be made whether a fusion object and/or a fusion grouping enters into the protected zone or whether the fusion object or the fusion object grouping enters into the protected zone for another fusion object and/or for another fusion object grouping at and/or up to that point in time and for a corresponding monitoring signal to be emitted on the finding of an entry. In this manner, an anticipation of danger situations can take place so that, for example, the apparatus or its moving part does not necessarily have to be stopped, but optionally a slowing of the movement is sufficient as the protective measure. Alternatively, a warning signal of a corresponding warning apparatus can be triggered at an early time by the monitoring signal. The prediction can take place using the results of the virtual object tracking in which speeds of the virtual objects can in particular be predicted. However, only data on the movement of fusion objects and/or fusion object groupings from preceding cycles can also be used to predict their position and/or movement for the next cycle or also for a plurality of cycles, for example by extrapolation. The point in time is preferably selected in relation to the point in time of the detection of the current image such that measures can still be taken in this period of time after the emission of a corresponding monitoring signal in order to avert the danger.

It is furthermore preferred for a check to be made whether a pre-determined section of the overlap region, in particular a danger zone, is hidden in at least one of the video images. On recognition of hiding, a monitoring signal can in particular be emitted which results in a stop of the apparatus or of the movement of the moving part of the apparatus or to a reduction in the speed of the movement of the moving part of the apparatus. Such a hiding recognition is possible in a simple manner since, in the method in accordance with the invention, spatial data are present with respect to the position and extent of fusion objects and/or fusion object groupings relative to one another and to the apparatus. It thus permits an improvement in the security of the monitoring.

On the operation of an apparatus over a longer period of time, the surrounding conditions, for example the lighting conditions, in the monitored zone and in particular also in the overlap region of the fields of view of the video cameras or properties of the video cameras can change, for example due to contamination. This can result in the recognition and/or tracking of virtual objects being impaired. It is therefore preferred for at least one pre-determined marking on at least one virtual object which corresponds to a real object of a pre-determined type to be recognized which is characteristic for the type of real object, for parts of at least one video image corresponding to the virtual object to be compared with reference data which are pre-determined for the type of real object, and for changes of the conditions in at least one part of the monitored zone, in particular lighting conditions, to be recognized in dependence on the result of the comparison and/or for a problem with a video camera used to detect the corresponding video image to be recognized in dependence on the result of the comparison. Corrections in the video images are preferably made in dependence on the result of the comparison or of the recognized changes prior to this processing or methods for the evaluation of the video images are adapted accordingly.

The reference data can be fixedly pre-determined. They can, however, also be up-dated continuously, which is in particular advantageous for a continuously operated apparatus or machine. The reference data can preferably be associated with a virtual object class which is associated with the virtual object.

It is basically sufficient to use video image sequences from only two video cameras in the method in accordance with the invention. To be able to preclude hiding in the overlap region as far as possible, video image sequences of at least three video cameras are preferably used whose fields of view overlap in the overlap region in the monitored zone. A virtual object recognition and/or tracking is then carried out in each case on the basis of each of the video image sequences. The results of the corresponding at least three virtual object recognition and/or tracking processes can then in particular be used for the formation of corresponding fusion objects which can also be defined better due to the larger number of the virtual objects used for their formation.

A further subject of the invention is a computer program with programming code means to carry out the method in accordance with the invention when the program is installed on a computer. A computer is here also understood as any data processing device which in particular has a processor, at least one memory and interfaces for the input and/or output of data. The computer can in particular have a digital signal processor.

The computer or, optionally, a computer network, is preferably made with two channels so that data for the mutual checking of the functional capability and freedom of errors can be exchanged and checked between the channels.

A subject of the present invention is furthermore a computer program product with programming code means which are stored on a computer-legible data carrier to carry out the method in accordance with the invention when the computer program product is installed on a computer. The data carrier can in particular be non-volatile storages in the form of corresponding semiconductor elements, CDs, DVDs or also floppy disks.

A subject of the present invention is moreover an apparatus for the monitoring of a monitored zone next to and/or in an apparatus having at least one driven moving part with at least two video cameras by means of which video images of two different fields of view can be detected which overlap at least partly in an overlap region in the monitored zone and having a data processing apparatus which is connected to the video cameras and is made to carry out the method in accordance with the invention. The data processing device can in particular be programmed with a computer program in accordance with the invention.

To permit a detection of the monitored zone which is as complete as possible and to be able to avoid hiding of parts of the monitored zone to as large an extent as possible, it is preferred for at least three video cameras to be used whose fields of view are different from one another and which overlap in the monitored area.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
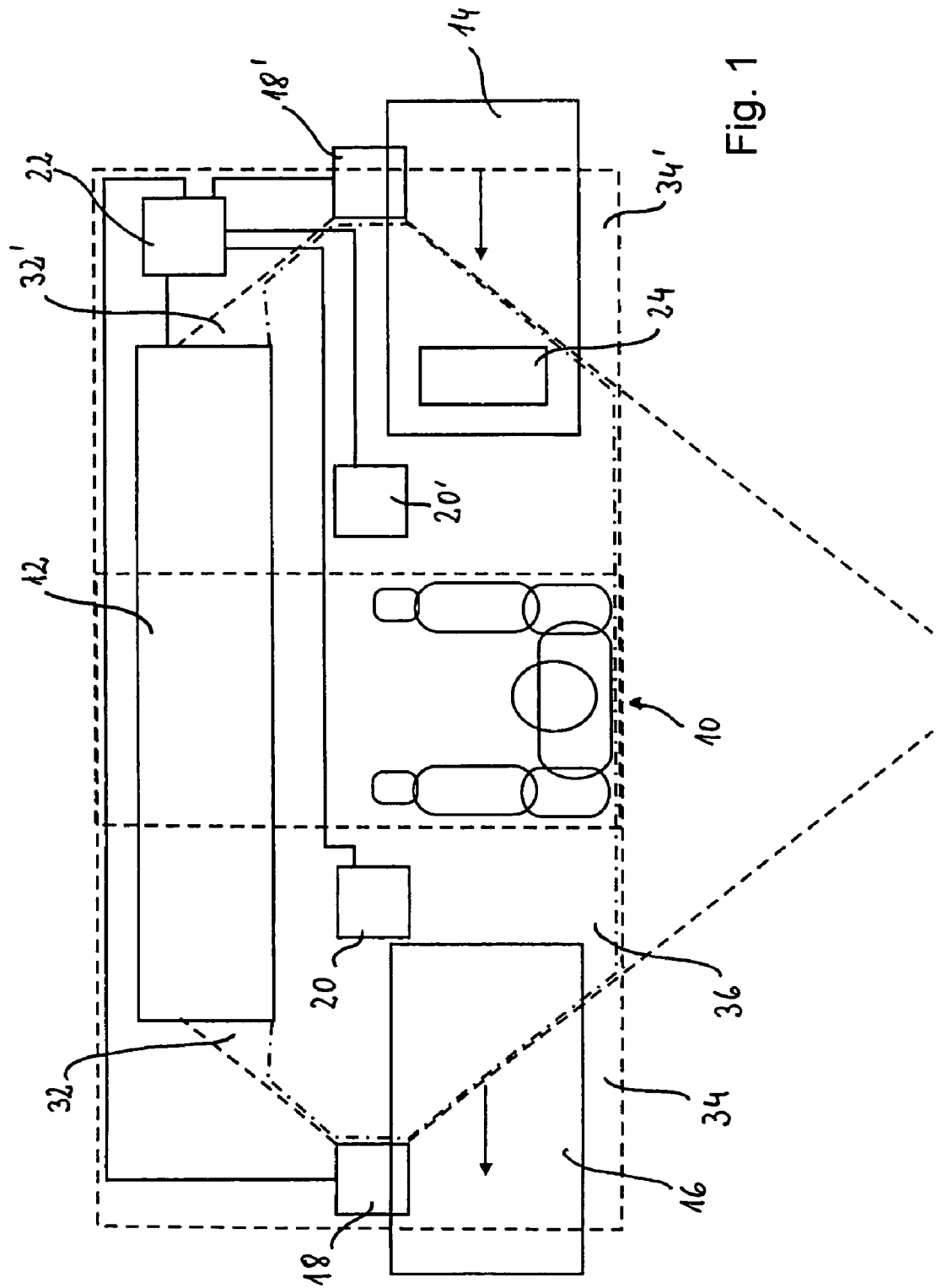
FIG. 1 shows a schematic plan view of a workplace with a stamping and bending press, two conveyor apparatuses, an operator and an apparatus for monitoring a monitored zone next to and in the stamping and bending press in accordance with a preferred embodiment of the invention.
Figure 2:
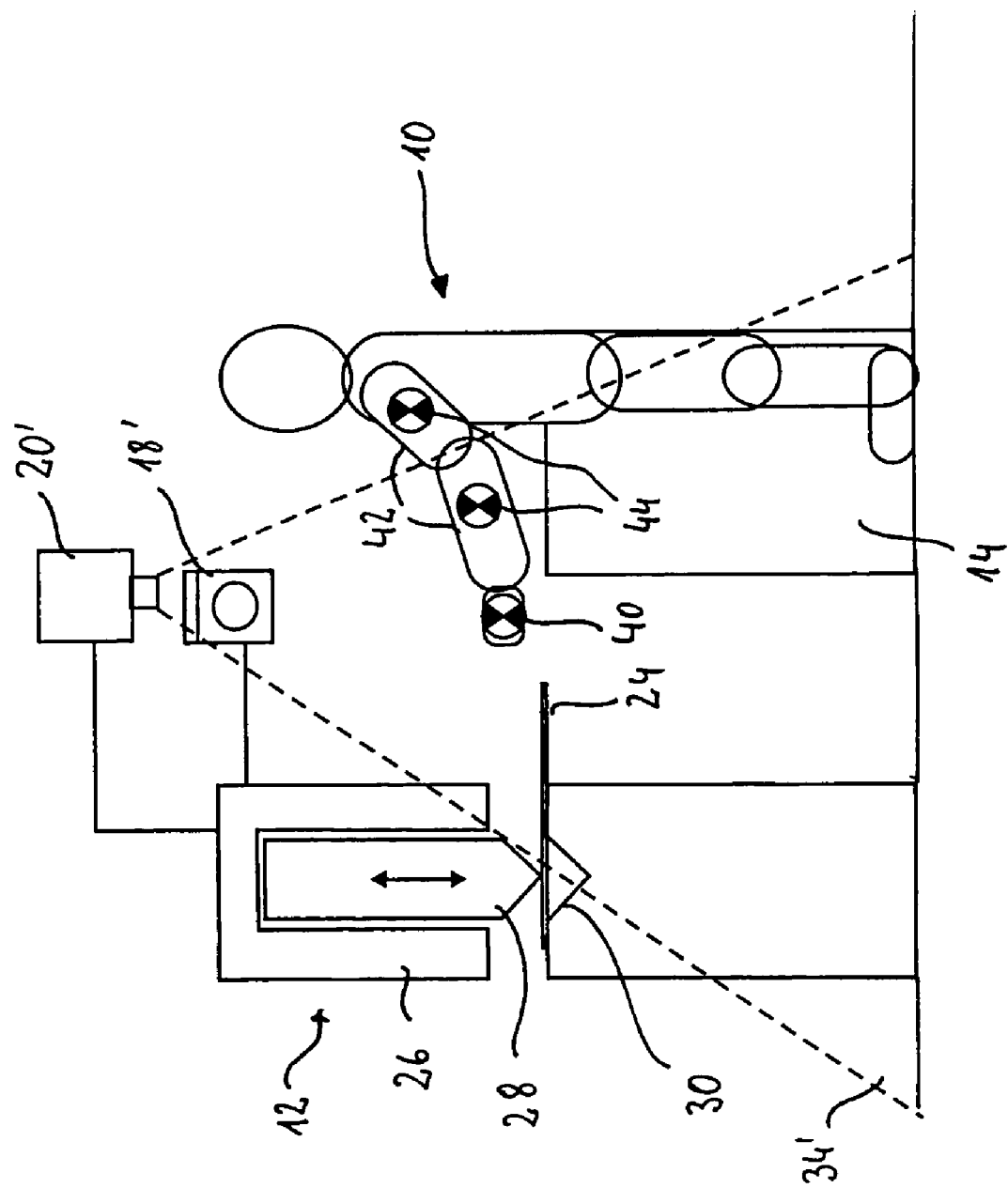
FIG. 2 shows a schematic side view of the workplace in FIG. 1.

In FIGS. 1 and 2, a stamping and bending press 12 is arranged at a workplace for an operator 10 as an apparatus having a driven movable part, two conveyor devices 14 and 16 and an apparatus for the monitoring of a monitored zone next to and in the stamping and bending press 12 with four video cameras 18, 18' and 20, 20' as well as having a data processing device 22 which is connected to the video cameras 18, 18' and 20, 20' and which, for the emission of monitoring signals to the stamping and bending press 12 or to a control thereof, is connected to said stamping band bending press or to said control thereof.

On the conveyor apparatus 14, a conveyor belt, workpieces 24, in the example metal sheets of a pre-determined shape to be bent using the stamping and bending press 12, are supplied to the workplace where they are taken from the conveyor apparatus 14 by the operator 10, are machined on the stamping and bending press 12 and can be placed on the conveyor apparatus 16 likewise provided by a conveyor belt for further transport to a further machining station after machining.

The stamping and bending press 12 comprises—shown only roughly schematically in FIG. 2—a bending stamp 28 in a support 26, said bending stamp being movable upwardly and downwardly via a drive not shown in the Figures and controllable by means of a control module, and a bending die 30 which includes a right-angled V groove in the example.

For the machining of a workpiece 24, it is placed into the stamping and bending press 12 between the bending stamp 28 and the bending die 30, whereupon it is bent into a pre-determined shape by movement of the bending stamp 28 toward the bending die 30.

For the monitoring of the area in front of or next to the stamping and bending press 12, the two color video cameras 18, 18' arranged to the side of the workplace and the two color video cameras 20, 20' arranged above the workplace are provided whose fields of view 32, 32' and 34, 34' marked by broken lines overlap, due to of possible hidden areas by the stamping and bending press 12 and the conveyor apparatuses 14 and 16, in the overlap region 36 which represents a monitored zone which is marked roughly schematically by chain-dotted lines in FIG. 1.

The positions of the video cameras 18, 18' and 20, 20' relative to one another and to the stamping and bending press 12 are fixedly pre-set and known. The imaging properties of the optical systems of the video cameras 18, 18' and 20, 20' are moreover known so that the position of a point can be determined from video image points of video images of the video cameras 18, 18' and 20, 20' substantially detected synchronously and corresponding to this point in the overlap region 36.

Video images or video image sequences detected substantially synchronously by the video cameras 18, 18' and 20, 20' in a time sequence are supplied separately to the data processing apparatus 22 where they are processed for the carrying out of a method for the monitoring of the monitored zone 36 in accordance with a preferred embodiment of the invention. The data processing device 22 includes for this purpose interfaces for the detection of the video images and for the emission of monitoring signals to the control module of the stamping and bending press 12, a processor connected to the interfaces and storage devices connected to the processor in which inter alia a computer program in accordance with a preferred embodiment of the invention is stored and with which the processor is programmed for the carrying out of the method.

In another embodiment, the data processing apparatus can also be integrated in the video cameras, with them being networked with one another for the exchange of the data.

The video camera 18, 18' and 20, 20' form—together with the data processing apparatus 22—an apparatus for the monitoring of a monitored zone in accordance with a preferred embodiment of the invention.

The operator 10 wears work gloves 38 with markings 40 and work clothing 42 with markings 44.

In the following, the method for the monitoring of the monitored zone 36 in accordance with a preferred embodiment of the invention is described more precisely.

In an operation of the stamping and bending press 12, video images are detected in a time sequence substantially synchronously by the video cameras 18, 18' and 20, 20' in their respective fields of view 32, 32' and 34, 34' and are transmitted to the data processing apparatus 22 in which the four video image sequences are then initially further processed separately from one another.

One cycle of the method is carried out for each set of substantially synchronously detected, current video images, in the example for each pair of video images.

Virtual object recognition and tracking processes are carried out separately from one another on the basis of the sequences of video images of the video cameras 18, 18' and 20, 20'. The same process is used for each of the sequences. For this reason, the explanations on the virtual object recognition and tracking processes can be restricted to the virtual object recognition and tracking process for the video images of the video camera 18.

Virtual objects are formed and classified in the respectively current video image in each cycle. For this purpose, the video image is segmented with reference to the color and texture of image regions, with regions connected to one another being formed as segments in the video image which correspond to surface regions on corresponding real objects which have similar properties with respect to the color and texture. A respective connected region corresponds to a virtual object. Positional data are associated with all virtual objects and reflect their positions in the video image. The positional data can, for example, be given by the geometrical center of the connected regions.

The virtual objects formed are thereupon classified. Different criteria are used for this purpose.

For instance, sections are pre-defined in the video images which correspond to the part of the overlap region 36 on the conveyor apparatus 14. Virtual objects which occur for the first time in these sections are classified as workpieces, since it is assumed that only workpieces can occur on the conveyor apparatus 14.

Connected regions in the video image which enclose a pattern corresponding to the markings 40 and 44 are recognized as work gloves 38 or as work clothing 42 of an operator in dependence on the color and are classified together as virtual objects of the class person's clothing.

After the classification, for the determination of the position of real objects or real object areas, corresponding virtual objects in the video images are associated with one another and corresponding fusion objects are formed whose positions, shapes and extents are recognized in dependence on the virtual object classes of the virtual objects underlying the fusion objects and on the sizes of the virtual objects recognized in the video images.

A fusion object class is associated with each fusion object in dependence on the classes of the virtual objects forming said fusion object and said fusion object class furthermore includes a reference body which is typical for the virtual object class and which represents the shape of the fusion object in space in a simplified manner. Positions of the fusion objects in space are furthermore determined from the respective data with respect to the position in the video images while taking account of the positions and imaging properties of the video cameras 18, 18', 20 and 20'.

Fusion objects determined in this manner are then, where possible, associated with fusion objects known from the preceding cycle, with their positions, movement speeds and movement directions being up-dated. The movement speeds and movement directions result from the differences of the positions in the current cycle and the preceding cycle and from the time span between these cycles.

Where possible, a fusion object grouping which includes fusion objects whose movements are coupled is then formed from the fusion objects. The formation takes place when the fusion objects fall below a pre-determined maximum spacing from one another or contact one another and either pre-determined fusion object classes are assigned to the fusion objects or the fusion objects have markings of the type of the markings 40 and 44.

In the example, the fusion object corresponding to the work glove 38 and the fusion object corresponding to the work clothing 42 or to the sleeve thereof are combined to a fusion object grouping "arm" which should represent the total arm of the operator.

A class for fusion objects or fusion object groupings is then assigned to each new fusion object which is not part of a fusion object grouping and to each new fusion object grouping. For this purpose, three fusion object classes are provided, namely those for real objects which are critical to safety and which are to be protected under all circumstances. In particular persons are covered by this. Furthermore, a class for fusion objects and/or fusion object groupings for neutral real objects is provided which are not to be protected and which can in particular come into contact, for example, with the bending stamp 28 as a potentially dangerous part of the stamping and bending press 12. The workpiece 24 is an example for this.

Finally, a class for fusion objects and a class for fusion object groupings can be provided into which real objects fall which should not collide with other real objects.

Protected zones or fields are furthermore associated with fusion objects, in particular those which correspond to real objects to be protected. This is done in dependence on at least one or more factors.

In the present example, protected areas are associated with pairs of fusion objects and/or fusion object groupings which include either two fusion objects, two fusion object groupings or one fusion object and one fusion object grouping. The protected zone is associated with a fusion object or a fusion object grouping of the pair, with an infringement of the protected zone by the other fusion object or by the other fusion object grouping of the pair being checked.

A protected zone, which corresponds in its shape to the shape of the fusion object grouping, is associated with the fusion object grouping "arm" or with the fusion objects constituting it in each case with respect to the bending stamp 28 or to a corresponding fusion object, with the extent being given by the maximum speed of the movement of the fusion object grouping to be expected and by the time which is necessary to stop the movement of the bending stamp 28.

For example, a protected zone is assigned to a fusion object such as the hand as the fusion object to be protected in connection with the bending stamp 28 as the neutral fusion object and its size depends on how fast the fusion object, i.e. the hand in the example, can move and which time or which path is necessary to stop the movement of the bending stamp 28.

In contrast, no protected zone or a protected zone with zero extent is associated with a pair of a workpiece 24 and a hand, since the hand has to be able to contact the workpiece for machining.

If a fusion object or a fusion object grouping now enters into a protected zone of another fusion object or of a fusion object grouping, a monitoring signal is emitted to the control module of the stamping and bending press 12, whereupon the movement of the bending stamp 28 is stopped. For example, a hand holding a metal sheet to be bent can be clamped between the bending press and the metal sheet by a movement of the metal sheet on the bending when the corresponding section of the metal sheet is moved toward the pressing beam by the bending procedure. This situation can be easily recognized with the described method.

Furthermore, the movement of the fusion object representing the workpiece 24 and of the fusion object grouping representing the "arm" is predicted for further cycles, for example four cycles, in dependence on corresponding positions in preceding cycles and a check is made at the end of the prediction time period whether a protected zone infringement is present. If this is the case, a corresponding monitoring signal is output to the stamping and bending press 12 which thereupon initally only reduces the speed at which the bending stamp 28 is moved toward the bending die 30.

Furthermore, a check is continuously made whether parts in the monitored zone 36 are hidden. If this is the case, a corresponding monitored signal is output to the stamping and bending press 12 which thereupon stops the movement of the bending stamp 28.

Finally, a continuous check is made whether the video image areas corresponding to the markings 40 and 44 correspond to corresponding reference data for the markings. If this is not the case, a change of the lighting conditions is assumed and the detected video images and/or evaluation algorithms are corrected accordingly, where possible. Otherwise a warning signal is output.

The monitoring process therefore permits a differentiated reaction to different danger situations for the operator 12, with a real time processing of the video images being simultaneously made possible.

REFERENCE NUMERAL LIST

10 operator
12 stamping and bending press
14 conveyor apparatus
16 conveyor apparatus
18, 18' video cameras
20, 20' video cameras
22 data processing apparatus
24 workpiece
26 support
28 bending stamp
30 bending die
32, 32' fields of view
34. 34' fields of view
36 overlap region or monitored zone
38 work gloves
40 mark
42 work clothing
44 marks The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for the monitoring of a monitored zone next to and/or in an apparatus having at least one driven, movable part wherein video images are used which were detected in a time sequence by at least two video cameras whose fields of view overlap at least in part in an overlap region in the monitored zone; on the basis of the first video images detected by a first one of the video cameras, a first recognition and/or tracking of virtual objects is carried out and, on the basis of the second video images detected by a second one of the video cameras, a second recognition and/or tracking of virtual objects is carried out, the virtual objects corresponding to real objects at least in the overlap region; for the classification and/or determination of the position and/or the movement of at least one real object in the overlap region, virtual objects corresponding to the real object from the first and second virtual object recognition and/or tracking processes are determined and data determined in each case for both virtual objects on their virtual object recognition and/or tracking are evaluated; and at least one monitoring signal is formed in dependence on the evaluation; and a fusion object is associated with virtual objects of the first and second object recognition and/or tracking processes corresponding to the same object.

2. A method in accordance with claim 1, wherein, for the definition of virtual objects in the video images, connected areas are determined which correspond to surface areas on an object corresponding to a virtual object which have similar surface properties in accordance with at least one pre-determined criterion.

3. A method in accordance with claim 1, wherein, for the definition of the virtual objects in the video images, connected areas are determined which have similar gray values and/or colors and/or textures in accordance with at least one pre-determined criterion.

4. A method in accordance with claim 1, wherein at least one virtual object class is assigned to the virtual objects.

5. A method in accordance with claim 1, wherein pre-determined features on virtual objects are recognized; and wherein at least one virtual object class is associated with the virtual objects in dependence on the recognized pre-determined features.

6. A method in accordance with claim 1, wherein only moving virtual objects are recognized and/or tracked in the virtual object recognition and/or tracking.

7. A method in accordance with claim 6, wherein a background which does not move and/or change over the course of time is eliminated from the used video images for the determination of at least one moving virtual object.

8. A method in accordance with claim 1, wherein the position and/or movement and/or properties of said fusion object being determined in dependence on data with respect to the positions and/or movements and/or properties of the virtual objects corresponding to the real object.

9. A method in accordance with claim 8, wherein, after formation of a fusion object in a cycle, its data with respect to its position and/or movement and/or properties are up-dated in dependence on the data of the virtual objects corresponding to the real object with respect to their positions and/or movements and/or properties in at least one following cycle.

10. A method in accordance with claim 8, wherein, if, in the virtual object tracking of a virtual object associated with a fusion object, said virtual object is not recognized in a current video image, only the data of another virtual object associated with the fusion object with respect to its position and/or movement and/or properties are used for the determination of data with respect to the position and/or movement and/or properties of the fusion object.

11. A method in accordance with claim 8, wherein a fusion object class or a class for virtual object groupings or fusion object groupings is associated with at least one fusion object and/or one virtual object grouping or fusion object grouping.

12. A method in accordance with claim 11, wherein pre-determined features on objects are recognized; and wherein at least one fusion object class or a class for virtual object groupings or fusion object groupings is associated with the fusion objects and/or virtual object groupings or fusion object groupings in dependence on the recognized, pre-determined features on virtual objects associated with the fusion objects or virtual object groupings or fusion object groupings.

13. A method in accordance with claim 8, wherein a protected zone is assigned to at least one moving fusion object and/or to one moving fusion object grouping; and wherein a check is made whether another fusion object and/or another fusion object grouping is entering into the protected zone.

14. A method in accordance with claim 13, wherein a class is assigned to at least one fusion object and/or one fusion object grouping; and wherein a protected zone is assigned to the fusion object or to the fusion object grouping at least in dependence on the assigned class.

15. A method in accordance with claim 13, wherein a protected zone is assigned to a fusion object and/or to a fusion object grouping at least in dependence on its position and/or movement, in particular on its movement direction and/or movement speed.

16. A method in accordance with claim 13, wherein a movement of at least one fusion object and/or of one fusion object grouping at at least one future point in time is predicted; wherein a check is made whether a fusion object and/or a fusion grouping enters into the protected zone or the fusion object or the fusion object grouping enters into the protected zone of another fusion object and/or of another fusion object grouping; and wherein a corresponding monitoring signal is emitted on the finding of an entry.

17. A method in accordance with claim 1, wherein one virtual object grouping or one fusion object grouping is formed from at least two virtual objects or fusion objects whose movement is coupled.

18. A method in accordance with claim 1, wherein a class for virtual objects or fusion objects or virtual object groupings or fusion object groupings is associated with a virtual object and/or a fusion object and/or a virtual object grouping and/or a fusion object grouping in dependence on whether at least one section of the virtual object or of the fusion object or of the virtual object grouping or fusion object grouping is moved into a pre-determined section of the monitored zone.

19. A method in accordance with claim 18, wherein at least one class is used for fusion objects and/or fusion object groupings for fusion objects or fusion groupings critical to safety and at least one class is used for fusion objects and/or fusion object groupings for neutral fusion objects or fusion object groupings.

20. A method in accordance with claim 1, wherein a check is made whether a pre-determined section of the overlap region, in particular a danger zone, is hidden in at least one of the video images.

21. A method in accordance with claim 1, wherein at least one pre-determined marking is recognized on at least one virtual object, which corresponds to a real object of a pre-determined type, said marking being characteristic for the type of real object; wherein parts of at least one video image corresponding to the virtual object are compared with reference data which are pre-determined for the type of real object; and wherein changes of the conditions in at least one part of the monitored zone, in particular lighting conditions, are recognized in dependence on the result of the comparison and/or a problem with a video camera used for the detection of the corresponding video image is recognized in dependence on the result of the comparison.

22. A computer program with program code means embodied as computer executable instructions on a computer readable medium and adapted, when installed on a computer, to carry out a method for the monitoring of a monitored zone next to and/or in an apparatus having at least one driven, movable part wherein video images are used which were detected in a time sequence by at least two video cameras whose fields of view overlap at least in part in an overlap region in the monitored zone; on the basis of the first video images detected by a first one of the video cameras, a first recognition and/or tracking of virtual objects is carried out and, on the basis of the second video images detected by a second one of the video cameras, a second recognition and/or tracking of virtual objects is carried out, the virtual objects corresponding to real objects at least in the overlap region; for the classification and/or determination of the position and/or the movement of at least one real object in the overlap region, virtual objects corresponding to the real object from the first and second virtual object recognition and/or tracking processes are determined and data determined in each case for both virtual objects on their virtual object recognition and/or tracking are evaluated; and at least one monitoring signal is formed in dependence on the evaluation; and a fusion object is associated with virtual objects of the first and second object recognition and/or tracking processes corresponding to the same object.

23. A computer program product with program code means which are stored on a computer readable medium, said computer program product being adapted, when the computer program product is installed on a computer, to carry out a method for the monitoring of a monitored zone next to and/or in an apparatus having at least one driven, movable part wherein video images are used which were detected in a time sequence by at least two video cameras whose fields of view overlap at least in part in an overlap region in the monitored zone; on the basis of the first video images detected by a first one of the video cameras, a first recognition and/or tracking of virtual objects is carried out and, on the basis of the second video images detected by a second one of the video cameras, a second recognition and/or tracking of virtual objects is carried out, the virtual objects corresponding to real objects at least in the overlap region; for the classification and/or determination of the position and/or the movement of at least one real object in the overlap region, virtual objects corresponding to the real object from the first and second virtual object recognition and/or tracking processes are determined and data determined in each case for both virtual objects on their virtual object recognition and/or tracking are evaluated; and at least one monitoring signal is formed in dependence on the evaluation; and a fusion object is associated with virtual objects of the first and second object recognition and/or tracking processes corresponding to the same object.

24. An apparatus for the monitoring of a monitored zone next to and/or in an apparatus having at least one driven movable part with at least two video cameras by means of which video images of two different fields of view can be detected which overlap at least partly in an overlap region in the monitored zone; and a data processing apparatus which is connected to the video cameras and is made to carry out a method for the monitoring of a monitored zone next to and/or in an apparatus having at least one driven, movable part wherein video images are used which were detected in a time sequence by at least two video cameras whose fields of view overlap at least in part in an overlap region in the monitored zone; on the basis of the first video images detected by a first one of the video cameras, a first recognition and/or tracking of virtual objects is carried out and, on the basis of the second video images detected by a second one of the video cameras, a second recognition and/or tracking of virtual objects is carried out, the virtual objects corresponding to real objects at least in the overlap region; for the classification and/or determination of the position and/or the movement of at least one real object in the overlap region, virtual objects corresponding to the real object from the first and second virtual object recognition and/or tracking processes are determined and data determined in each case for both virtual objects on their virtual object recognition and/or tracking are evaluated; and at least one monitoring signal is formed in dependence on the evaluation; and a fusion object is associated with virtual objects of the first and second object recognition and/or tracking processes corresponding to the same object.

* * * * *